Patented May 6, 1941

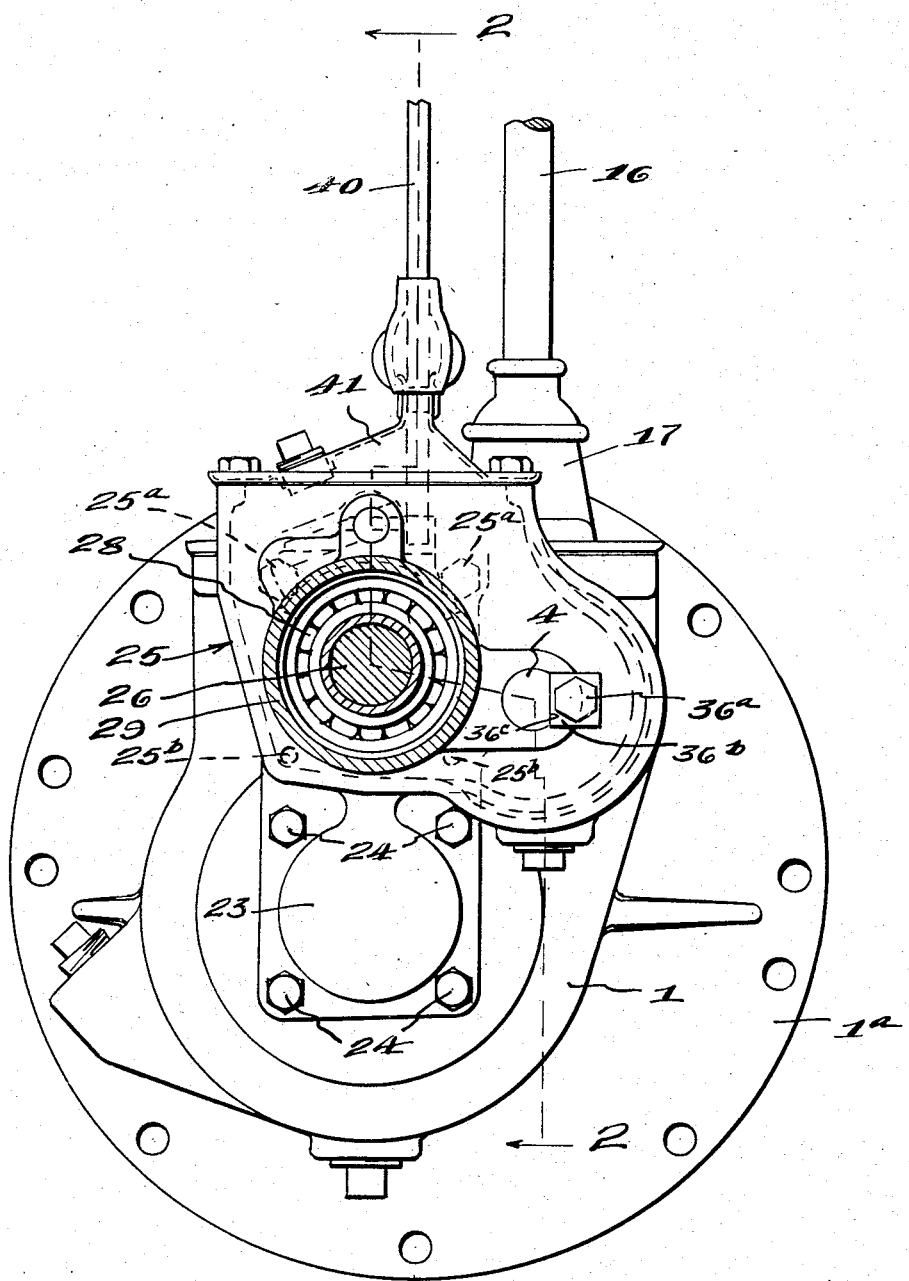

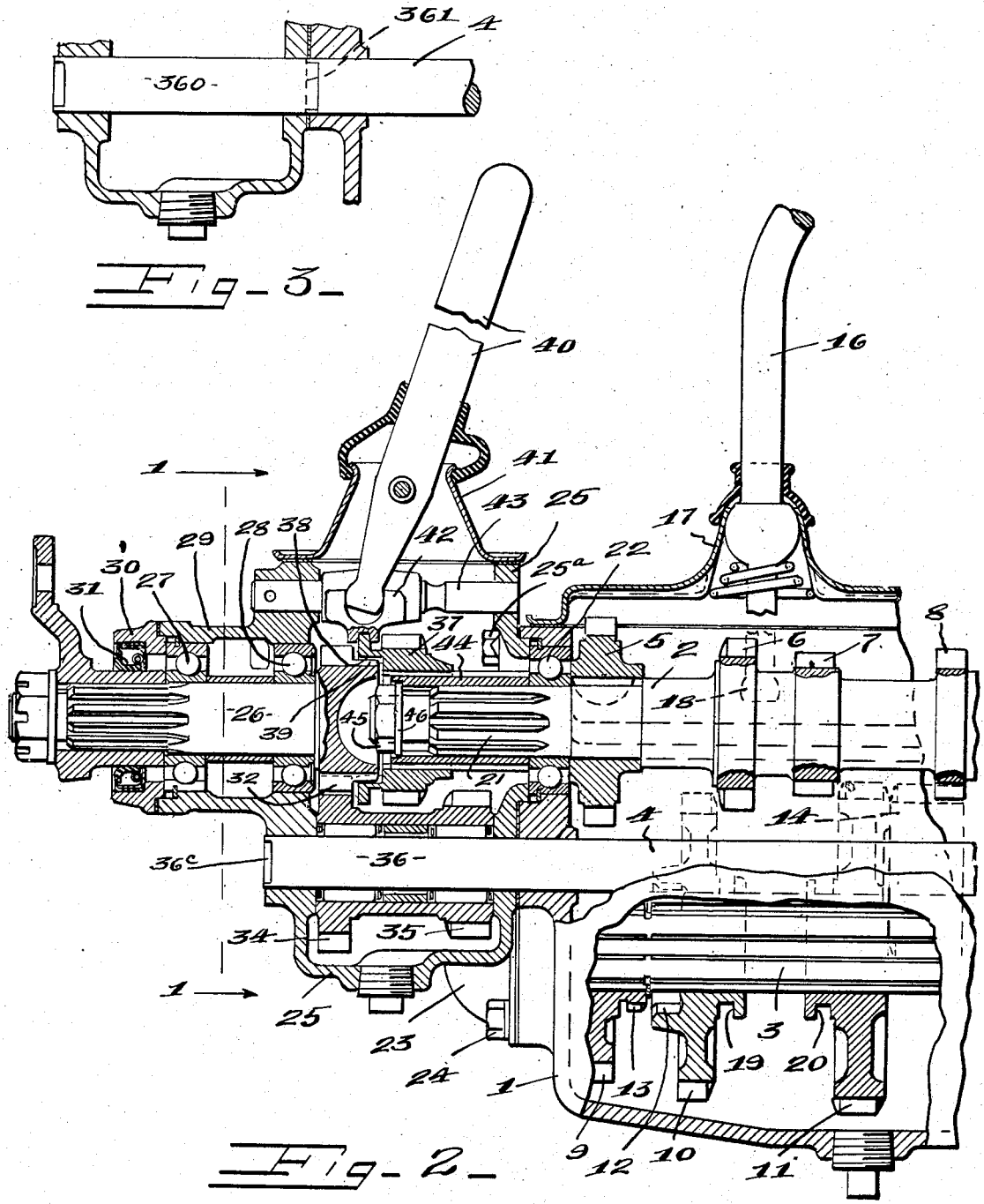

2,241,002

UNITED STATES PATENT OFFICE 2,241,002

AUXILIARY TRANSMISSION GEARING

Carl D. Peterson, Toledo, Ohio, assignor to Spicer Manufacturing Corporation, Toledo, Ohio, a corporation of Virginia Application December 18, 1937, Serial No. 180,617

5 Claims. (Cl. 74—338)

This invention relates to transmission gearings for motor vehicles, and has for its object an auxiliary gearing operable in connection with a main gear box, and more particularly an auxiliary transmission gearing for varying or multiplying the torque of the input shaft of the gearing.

It further has for its object an auxiliary transmission gearing, which is readily applied to a standard gear box and the input shaft of the gearing.

It further has for its object an auxiliary gear box in which some of the gears are mounted upon an extension of one of the regular shafts of the main gear box, which shaft is usually non-rotatable, as the shaft on which the reverse gears or reverse gear spool in the main gear box are mounted.

The invention consists in the novel features and in the combinations and constructions hereinafter set forth and claimed.

In describing this invention, reference is had to the accompanying drawings in which like characters designate corresponding parts in all the views.

Figure 1 is an end view, partly in section, of this gearing, it being taken upon line 1—1, Figure 2.

Figure 2 is a longitudinal sectional view of the gearing taken approximately on line 2—2, Figure 1, the rear end (right end of Figure 2) being broken away.

Figure 3 is a fragmentary sectional view of parts seen in Figure 2 showing the extension of one of the shafts of the main gearing, which extension constitutes the countershaft of the auxiliary gearing, as a separable part from that shaft of the main gearing.

The transmission gearing comprises, generally, an auxiliary gear set including a gear box mountable on the end wall of the main gear box and a drive shaft mounted in the auxiliary gear box in axial alinement with the extension of the input shaft of the main gear set, gearing between the drive shaft and the input shaft including gears on a countershaft, and a shiftable element shiftable into one position to connect the drive and input shafts in direct drive relation and into another position to connect them in indirect drive relation through the gears on the countershaft. The indirect drive relation is usually an under drive, so as to multiply the torque applied to the input shaft.

The auxiliary transmission gearing is designed for use in connection with a main gear set.

The invention is shown as applied to an indirect drive transmission gearing.

1 designates the main gear box; 2 the input shaft; 3 the output shaft parallel to the input shaft; and 4 a non-rotatable idler shaft on which a reverse gear spool is mounted. The gear box 1 is shown as provided with an external flange 1ª for securement to a support, as for instance, the differential gear housing of the vehicle in which this gearing is installed. The flange is broken away in Figure 2 at the right hand end thereof.

5, 6, 7 and 8 designate gears on the input shaft 2; 9, 10 and 11 are gears on the output shaft 3, the gear 9 being rotatable about the output shaft and meshing with the gear 5, the gear 10 being rotatable with or splined to the output shaft and shiftable in one direction, as to the left from neutral, to engage a clutch face 12 thereon with the clutch face 13 on the gear 9 to lock the gear 9 to the output shaft 3, so that the drive from the shaft 2 to the shaft 3 is through these gears 5 and 9. The gear 10 is shiftable in the opposite direction, or to the right from neutral, so that the drive between the shafts 2, 3 is through the gears 6 and 10. The gear 11 is rotatable with or splined to the output shaft and shiftable in one direction or to the left from neutral, into mesh with the gear 7, so that the drive between the input shaft 2 and output shaft 3 is through the gears 7 and 11. The gear 11 is shiftable to the right from neutral into mesh with a reverse idler 14 which meshes with the gear 11 on the input shaft 2, so that the reverse drive is through the gears 11, 14 and 8. The gears 10 and 11 are shifted by any suitable selecting and shifting mechanism including a selecting and shifting lever 16 supported in the cover 17 of the gear box 1 and shiftable laterally from neutral position to cause the lower end 18 thereof to select the fork to be shifted and movable fore and aft to shift the selected fork. The forks, not shown, coact with grooves 19 and 20 in the hubs of the gears 10, 11 respectively.

The input shaft 2 has an extension or stem 21 extending through the front wall of the gear box and projecting beyond the same, this being mounted in an anti-friction bearing 22 in the front wall of the gear box. Usually the input shaft is the clutch shaft of the power plant or is connected to the clutch shaft, and a bearing cap or ring encircles the clutch shaft and thrusts against the bearing 22 and is secured to the end wall of the gear box in the usual manner. The output shaft 3 is similarly journalled in the gear box 1 and the bearing therefor closed by a cap 23 secured in position, as by cap screws 24.

25 designates the auxiliary gear box, which is mounted on the main gear box in place of a cap, similar to the cap 23, usually provided to cover the bearing 22 for the input shaft.

The auxiliary gear box 25 is secured to the main gear box by cap screws 25ª, 25ᵇ taking the places of the screws ordinarily used for holding the cap for the bearing of the input shaft, the two upper screws 25ª extending from the inside of the auxiliary gear box 25 into the end wall of the main gear box 1, and the two lower screws 25ᵇ extending from the inside of the main gear box through the end wall and threading into the opposing end wall of the auxiliary gear box.

This auxiliary gearing includes a drive shaft 26 journalled in the auxiliary gear box 25 in axial alinement with the input shaft 2 and gearing between the drive shaft 26 and the input shaft 2 or the extension 21 thereof including a shiftable element operable into one position to connect them in direct drive relation and into another position to connect them in an indirect drive relation. The drive shaft 26 is journalled in spaced apart bearings 27, 28 at the opposite ends of the tubular projection 29 on the outer or front end wall of the auxiliary gear box 25 and the outer end of the tubular projection is closed by a suitable ring 30 in which is mounted an oil retaining device 31. The drive shaft 26 is the stem of a stem gear 32 and may be the clutch shaft or connected to the clutch shaft. The inside diameter of the tubular extension 29 is large enough to permit the gear 32 with the shaft 26 to be placed therethrough in position, and the bearings 27, 28 placed in position at the same time. The ring 30 serves to hold the parts assembled in the tubular extension 29.

The gears of the auxiliary gearing, in addition to the gear 32, includes gears 34, 35, these being shown as a unit construction or as a spool and mounted to rotate about an extension of one of the shafts of the main gear box, these gears 34, 35 being mounted to rotate about an extension 36 of the shaft or rod 4 on which the reverse spool of the main gear box is mounted, the extension being fixedly mounted in the opposite end walls of the gear box 25. The gears of the auxiliary gearing also includes a shiftable gear element 37 rotatable with the extension 21 of the input shaft 2 and having a clutch face 38 on one side thereof for coacting with a complemental clutch face 39 on the gear 32 and thus connecting the drive shaft 26 and input shaft 2 in direct drive relation. The gear 37 is shiftable into mesh with the gear 35 to connect these shafts through the gears 32, 34, 35 and 37 in indirect drive relation. The element 37 is shifted by a shifting lever 40 pivoted in a cover or tower 41 on the auxiliary gear box 25 and coacting with a shifter 42 slidable along the shift rod 43.

A retaining member, as a cap screw 36ª and non-circular washer 36ᵇ, is utilized to hold the shaft or rod 4 and its extension from endwise movement in one direction, the washer seating in a recess 36ᶜ in the end of the rod 36 and the screw 36ª threading into the outer or front end wall of the box 25.

In Figure 3, the extension of the shaft 4, which extension constitutes the countershaft of the auxiliary gearing, instead of being integral with the shaft 4 is a separate part 360 arranged in alinement with the shaft 4 and coupled thereto. In this embodiment of my invention, the shaft 4 is a non-rotatable rod. The extension 360 is coupled to the rod 4 in end to end relation therewith by means of a transverse tongue 361 on one end of the extension 360 and fitting into a complemental transverse slot in the end of the shaft 4. The outer end of the extension 360 is locked or held from turning by any suitable means, as the retaining member 36ª and washer 36ᵇ, as shown in Figure 1. If the countershaft of the auxiliary gearing were alined with a rotating shaft of the main gearing, it would have a pilot bearing in such other shaft.

For facilitating the assembly of the auxiliary gearing, and particularly the shiftable gear 37 on the output shaft 2 or the extension 21 thereof, the gear 37 is slidably splined on a sleeve 44, which is splined on the extension 21, the sleeve thrusting at its inner end against the inner ring of the anti-friction bearing 22 and being held from axial displacement off the end of the extension 21 by a nut 45 threading on the reduced end of the extension 21 against a washer 46, which thrusts against an annular shoulder on the extension 21 and also an annular shoulder at the outer end of the sleeve 44. Thus, in applying the auxiliary gear to the main gear box, the sleeve is assembled on the extension 21 and then the auxiliary gear box mounted on the end wall of the main gear box and the extension 36 of the shaft or rod 4, as before described, and the shiftable gear placed on the sleeve 44, the drive shaft 26 and its gear 27 and bearing then assembled in position through the tubular part 29. The cap or tower 41 of the shifting lever may then be placed in position. The shifting fork or block 42 may then be swung upward out of position to permit the insertion of the gear 37 and moved back into position when the tower with the gear shifting lever 40 is assembled to the auxiliary gear box 25.

What I claim is:

1. In a transmission gearing, the combination of a gear box having a change-speed gear set therein including an input shaft journalled in an end wall of the gear box and extending through the same, an output shaft, trains of gears between the shafts to produce different speeds and selectively operable shiftable elements for selectively connecting any one of the trains of gears in operative driving relation between the input and output shafts, and an auxiliary gear set including a second gear box mounted on the end wall of the first gear box and into which the input shaft extends, a drive shaft mounted in the second box in axial alinement with the input shaft and gearing in the second box including a shiftable element operable independently of the former shiftable elements into one position to connect the drive and input shafts in direct drive relation and into another position to connect them together in indirect drive relation, whereby the shiftable element in the second gear box can be operated into either of its positions when any one of the first shiftable elements are in operative position.

2. In a transmission gearing, the combination of a gear box having a change-speed gear set therein including a plurality of shafts, trains of gears between the shafts including shiftable elements operable to connect the shafts through different gear ratios, one of the shafts being an input shaft journalled in an end wall of the gear box and projecting outside of the gear box, the gear set including a gear support having an extension through said end wall parallel to the input shaft, the gear box having a bearing in said end wall for the input shaft, and an auxiliary gear set including a second gear box mounted on the end wall of said gear box and through which the input shaft projects, a sleeve mounted on and rotatable with the input shaft and thrusting at one end against said bearing, means coacting with the other end of the sleeve to hold it from axial displacement, a drive shaft mounted in the second gear box in axial alinement with the input shaft, gearing in the second box including a shiftable element mounted on and rotatable with the sleeve and gears mounted on and rotatable about the extension of the gear support, the shiftable element being shiftable into one position to clutch the drive and input shafts in direct drive relation and in another position to connect them in indirect drive relation through the gears on the extension of the second gear support.

3. In a transmission gearing, the combination of a gear box having a change-speed gear set therein including a plurality of shafts and trains of gears between the shafts including shiftable elements operable to connect the shafts through different gear ratios, one of the shafts being an input shaft journalled in an end wall of the gear box and projecting through the same, and a second of said shafts being a reverse gear support on which reverse gearing is mounted, an auxiliary gear set including a second gear box mounted on the wall of the first gear box and into which the input shaft extends, the reverse gear support also extending into the second gear box, a drive shaft journalled in the second gear box in axial alinement with the input shaft, gearing in the second gear box including gears mounted on the extension of the reverse gear support, and also including a shiftable clutch and gear element on the input shaft and operable into one position to clutch the drive and input shafts in direct drive relation and into another position to connect them together in indirect drive relation through the gears on the extension of the reverse gear support.

4. The combination with a gear set including a gear box, and gearing therein including an input shaft journalled in an end wall of the gear box and extending through and beyond said wall; of an auxiliary gear box mountable on said end wall and gear set therein including a drive shaft mounted in the auxiliary gear box in axial alinement with the input shaft, and a sleeve mountable on and rotatable with the projecting portion of the input shaft, and gearing within the auxiliary gear box including a shiftable clutch and gear element slidable on and rotatable with the sleeve and being shiftable into one position to clutch the drive and input shafts in direct drive relation and into another position to connect the drive and input shafts in indirect drive relation.

5. In a transmission gearing, the combination of a gear box having a change-speed gear set therein including an input shaft journaled in an end wall of the gear box and extending through the same, an output shaft, and an idler gear support also extending through the end wall, trains of gears between the shafts including shiftable elements operable to connect the shafts through different gear ratios, said trains also including an idler gear rotatably disposed on the idler gear support, a second gear box detachably mounted on the end wall of the first gear box and into which the input shaft and the idler gear support extends, said idler gear support extending completely across the latter gear box and being journaled in an end thereof remote from the end wall of the first gear box, a drive shaft in the second gear box in axial alignment with the input shaft, a spool gear in the second gear box and mounted for rotation on the portion of the idler gear support which extends into the latter box, said spool gear having two sets of teeth, a gear mounted on and rotatable with the drive shaft and in constant mesh with one set of teeth on the spool gear, a sleeve disposed on and rotatable with the portion of the input shaft which projects through the end wall of the first gear box, and a shiftable clutch and gear element in the second gear box disposed on said sleeve and rotatable in unison with the sleeve and input shaft, said element being movable independently of the first-mentioned shiftable elements into meshing engagement with the other set of teeth on the spool gear to connect the input and drive shafts in indirect driving relationship and being movable into clutching engagement with the gear on the drive shaft to connect the input and drive shafts in direct relationship.

CARL D. PETERSON.

CERTIFICATE OF CORRECTION.

Patent No. 2,241,002.  May 6, 1941.

CARL D. PETERSON.

It is hereby certified that error appears in the printed specification of the above numbered patent requiring correction as follows: Page 3, first column, line 21, claim 2, strike out the word "second"; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.